(12) United States Patent
Juhl et al.

(10) Patent No.: US 11,292,413 B2
(45) Date of Patent: Apr. 5, 2022

(54) MEANS OF LOCOMOTION, ARRANGEMENT AND DEVICE FOR EVALUATING A SIGNAL OF AN AIRBAG CONTROL UNIT

(71) Applicant: VOLKSWAGEN AKTIENGESELLSCHAFT, Wolfsburg (DE)

(72) Inventors: Jochen Juhl, Lüdersfeld (DE); Jochen Hollinger, Landau (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/641,459

(22) PCT Filed: Aug. 15, 2018

(86) PCT No.: PCT/EP2018/072128
§ 371 (c)(1),
(2) Date: Feb. 24, 2020

(87) PCT Pub. No.: WO2019/042777
PCT Pub. Date: Mar. 7, 2019

(65) Prior Publication Data
US 2020/0198567 A1  Jun. 25, 2020

(30) Foreign Application Priority Data
Aug. 30, 2017  (DE) .................... 10 2017 215 106.4

(51) Int. Cl.
*B60R 21/017*    (2006.01)
*B60L 1/00*      (2006.01)
*B60R 21/01*     (2006.01)

(52) U.S. Cl.
CPC ............ *B60R 21/0173* (2013.01); *B60L 1/00* (2013.01); *B60R 2021/01286* (2013.01)

(58) Field of Classification Search
CPC ...... B60R 21/0173; B60R 2021/01286; B60R 21/01; B60L 1/00; B60L 2240/525; B60L 3/0007; B60L 3/0084
(Continued)

(56) References Cited

U.S. PATENT DOCUMENTS 6,088,639 A * 7/2000 Fayyad ................... B60R 21/01
                                                           180/271
6,250,670 B1 * 6/2001 Lehnst ............. B60R 21/01564
                                                           180/282

(Continued)

FOREIGN PATENT DOCUMENTS

CN    1649756    8/2005
CN    1926004    3/2007
(Continued)

OTHER PUBLICATIONS

International Search Report of PCT Application No. PCT/EP2018/072128, dated Nov. 28, 2018.
(Continued)

*Primary Examiner* — Muhammad Shafi
(74) *Attorney, Agent, or Firm* — Pearl Cohen Zedek Latzer Baratz LLP

(57) ABSTRACT

A means of locomotion, an arrangement as well as a device (1) for evaluating a signal of an airbag control unit (2) are being put forward. The device (1) comprises a first connection (3) for electrically contacting an output of the airbag control unit (2), a rectifier (5) that is electrically connected to the first connection (3), a temperature-compensated driver (6) that is connected to an output of the rectifier (6) [sic], and a member (7) for the galvanic decoupling of an output of the (Continued)

driver (6), having an output unit (8). The rectifier (6) provides polarity reversal protection for the first connection (3) so that the driver (6) receives an output signal from the airbag control unit (2) essentially identically, independently of its polarity.

9 Claims, 2 Drawing Sheets

(58) Field of Classification Search
USPC .................................................... 701/22
See application file for complete search history.

(56) References Cited

U.S. PATENT DOCUMENTS

| | | | |
|---|---|---|---|
| 10,391,960 B2* | 8/2019 | Settles ................. | B60R 21/0132 |
| 2006/0163946 A1 | 7/2006 | Henne et al. | |
| 2011/0163884 A1* | 7/2011 | Tame .................. | H04R 29/001 |
| | | | 340/626 |
| 2012/0194004 A1* | 8/2012 | Lim ........................ | B60L 58/18 |
| | | | 307/125 |
| 2013/0038045 A1* | 2/2013 | Kwon ..................... | B60R 21/01 |
| | | | 280/735 |
| 2013/0124051 A1* | 5/2013 | Sievers ................. | B60R 21/017 |
| | | | 701/45 |
| 2013/0197746 A1* | 8/2013 | Glueck ............... | B60R 21/0173 |
| | | | 701/34.4 |
| 2014/0252847 A1 | 9/2014 | Yang et al. | |
| 2015/0360569 A1* | 12/2015 | Kim .......................... | B60L 3/04 |
| | | | 701/22 |
| 2017/0136973 A1* | 5/2017 | Lee ..................... | B60R 21/0132 |

FOREIGN PATENT DOCUMENTS

| | | |
|---|---|---|
| CN | 209566872 U | 11/2019 |
| DE | 198 11 182 A1 | 9/1999 |
| DE | 2 000 5012 U1 | 7/2000 |
| DE | 101 28 950 A1 | 1/2003 |
| DE | 10361647 | 12/2003 |
| DE | 10235162 A1 | 2/2004 |
| DE | 10 2005 036 174 A1 | 2/2007 |
| DE | 10 2014 217928 | 9/2014 |

OTHER PUBLICATIONS

Office Action for Chinese Patent Application No. 201880054798.4 dated Sep. 13, 2021.

* cited by examiner

MEANS OF LOCOMOTION, ARRANGEMENT AND DEVICE FOR EVALUATING A SIGNAL OF AN AIRBAG CONTROL UNIT

CROSS-REFERENCE TO RELATED APPLICATIONS

This application is a National Phase Application of PCT International Application No. PCT/EP2018/072128, International Filing Date Aug. 15, 2018, claiming priority of German Patent Application No. 10 2017 215 106.4, filed Aug. 30, 2017, which is hereby incorporated by reference.

FIELD OF THE INVENTION

The present invention relates to an arrangement, to a means of locomotion and to a device for evaluating a signal of an airbag control unit. In particular, the present invention relates to the realization of an ignition lead that has polarity reversal protection and that is favorable in terms of energy and hardware technology.

BACKGROUND OF THE INVENTION

Modern vehicles are equipped with a wide array of active and passive safety systems. In case of a crash, ignition pellets respond by quickly filling inflatable gas vessels with the required amount of gas.

Electrically powered vehicles with high-voltage onboard systems (voltages above 50 V, especially above 300 V) additionally have a voltage disconnection function of the high-voltage onboard system in case of a crash. Towards this end, the crash signal is evaluated and disconnecting elements (contactors, semiconductors, pyrotechnical disconnecting elements) are actuated in order to disconnect the source of power from the traction onboard system.

The electric connection between the airbag control unit and the ignition pellets is checked on a regular basis or in response to an event in order to check whether the contacting of the ignition pellets is intact. In this process, electric signals are employed which are below the triggering threshold of the ignition pellets. The complexity of the underlying circuit topology, however, gives rise to sources of error, not only during the production, but also when it comes to the modification of the onboard system in repair shops or even at the final customer, and these errors can have a detrimental impact on the road safety of the means of locomotion.

German patent application DE 10 2005 036 174 A1 discloses a device to trigger battery disconnections in motor vehicles. In case of a crash, a signal generated by the airbag control unit is used to actuate or open a battery contactor.

German utility model DE 2 000 5012 U1 discloses a topology of a vehicle onboard system in which a disconnector is provided in order to disconnect the battery from the onboard system in response to a sensor signal. A dedicated source of power in the form of an auxiliary battery can be provided for actuating and triggering the disconnector.

U.S. Pat. Appln. No. 2011/0163884 A1 discloses an emergency detector in which the explosive acoustic signal of an inflating airbag is received via a loudspeaker of a means of locomotion and then utilized to output an emergency signal. A rectifier is provided in order to rectify the alternating signal of the inflating airbag.

Before the backdrop of the above-mentioned prior art, the present invention is based on the objective of putting forward a functionally reliable and cost-effective realization of a battery management controller (BMC) by means of which the ignition pellets can be successfully tested and a battery disconnecting element can be reliably triggered in case of a crash.

SUMMARY OF THE INVENTION

The above-mentioned objective is achieved according to the invention by a device for evaluating a signal of an airbag control unit. The airbag control unit can be provided for a means of locomotion, particularly a road vehicle. The device comprises a first connection for electrically contacting an output of the airbag control unit. In other words, a communication interface, especially an electric one, is provided by means of which an output signal, especially a test signal and/or a crash signal, of the airbag control unit can be picked up. Moreover, a rectifier is electrically connected to the first connection in order to allow compensation for a conceivable polarity reversal of the connection lines. A temperature-compensated driver is connected to the output of the rectifier. The output signal of the rectifier is thus compensated for in terms of the influence of the momentary ambient temperature in order to compensate for ambient temperature influences. Moreover, a threshold-value evaluation of the crash signal is carried out in the temperature-compensated driver. In other words, the rectified output signal of the airbag control unit is examined as to whether this is a test signal or an ignition signal. The output of the temperature-compensated driver is connected to a member for galvanic decoupling. The member for galvanic decoupling can relay an electric and/or magnetic and/or an optical signal that is independent of the potential of the device to an output unit, where it can be employed, for example, to open a contactor. Since the rectifier is used between the airbag control unit and the temperature-compensated driver, the driver can evaluate an output signal of the airbag control unit, independently of its polarity, and this signal can then be relayed by the member for galvanic decoupling. In other words, the rectifier provides polarity reversal protection for the first connection so that the driver receives an output signal from the airbag control unit essentially identically, independently of its polarity. Owing to the threshold-value evaluation and the temperature compensation, the evaluation of the signals received by the airbag control unit as well as their temperature compensation can be carried out in the galvanically insulated ignition lead inside the device. Thanks to the inventive use of the rectifier, an incorrect polarity between the airbag control unit and the device or ignition lead according to the invention can no longer cause a malfunction. Consequently, work on the cable harness, incorrectly connected plug-in connections or even intentional sabotage cannot give rise to any safety risk.

The subordinate claims put forward preferred refinements of the invention.

The output unit of the device according to the invention can have a crash-out line. In other words, a line that signals a crash to the onboard system can lead out of the device according to the invention. Owing to the galvanic decoupling, the crash-out line can have a completely different electric potential than the components located beyond the member for galvanic decoupling as well as the airbag control unit.

Likewise preferably, the device can have a current-limiting function by means of which the member for galvanic decoupling is protected. The current-limiting function can be comprised, for example, in the temperature-compensated driver. The current-limiting function can encompass a transistor and a resistor by means of which surplus electric energy is discharged before arriving at an input of the member for galvanic decoupling. In this context, it is possible to realize especially a non-linear characteristic curve of the electric resistance of the resistor that is connected in parallel to the input of the member for galvanic decoupling. The greater the surplus electric energy, the disproportionally lower the electric resistance of the resistor that is connected in parallel to the input.

In order for even small energy amounts that are received as a crash signal or test signal by the airbag control unit to be processed according to the invention, the rectifier can comprise transistors which can especially be configured as field-effect transistors (FETs). In comparison to the use of diodes, which have a relatively high threshold voltage for purposes of the use according to the invention as rectifier elements, the voltage decreasing at closed or conductive FETs is considerably lower, as a result of which the reliability of the circuitry can be further enhanced.

The member for galvanic decoupling can have, for instance, an optocoupler and, as an alternative or in addition, it can have a transformer. The transformer can support a capacitive or inductive transmission of energy without a galvanic connection.

The temperature compensation by means of the temperature-compensated driver is advantageous in view of the automotive temperature range in conjunction with the requisite triggering thresholds and it can have a transistor as a core component. This transistor can optionally be replaced by a diode. Since the airbag control unit can cyclically emit test pulses, it is absolutely necessary to prevent premature triggering of a battery contactor and/or of an airbag and/or of a pure pyro fuse. The influence exerted by the ambient temperature or by the temperature of the device according to the invention on the switching thresholds is reduced or completely eliminated by the temperature compensation being put forward according to the invention.

When the current pulses generated by the airbag control unit are being evaluated, preference should be given to a galvanic disconnection from the onboard system. For this reason, the evaluation of the current pulse by means of a member for galvanic decoupling, especially an optocoupler, a capacitive or inductive transformer or the like, should be handled by the microcontroller that carries out the evaluation of the current pulse and/or the actuation of subsequent components. The most cost-efficient alternative is, for example, an optocoupler. In case of a crash, the optocoupler sets the potential at the output of the device according to the invention to ground potential and the downstream microcontroller accordingly causes the battery contactors to open.

According to a second aspect of the present invention, an arrangement is being put forward that comprises an airbag control unit, an ignition pellet reproduction and a device according to the first-mentioned aspect of the invention. The first connection of the device is connected to a parallel circuit leading out of the output of the device and the ignition pellet reproduction. By means of the ignition pellet reproduction, the airbag control unit can ensure proper cabling to the device according to the invention. In other words, test pulses are emitted by the airbag control unit and they give rise to a predefined voltage drop or current flow (depending on the evaluation) at the ignition pellet reproduction. As a result, the airbag control unit can check for proper cabling to the device according to the invention. The electric voltage that drops in case of a crash serves concurrently as an input signal of the device according to the invention (namely, its rectifier). In the simplest case, the ignition pellet reproduction can consist of an ohmic resistor. The features, the feature combinations and the resultant advantages of the arrangement according to the invention correspond to those of the device according to the invention so obviously that, for the sake of avoiding repetitions, reference is hereby made to the elaborations above.

The airbag control unit can be configured to cyclically apply test pulses to the ignition pellet reproduction. In other words, after a predefined time has lapsed and/or in response to the presence of a predefined event, test pulses can be generated that have a voltage value or current strength that differs from a crash signal. In this manner, test signals can be reliably distinguished from an emergency or crash signal.

Moreover, an evaluation unit (for example, a microcontroller, an electronic control unit or the like) can be connected to an output of the member for galvanic decoupling. The evaluation unit is configured to open a contactor of a traction onboard system if an output signal of the member for galvanic decoupling has a predefined intensity (occurrence of a crash). In this manner, in case of a crash, the voltage source is disconnected from the traction onboard system and the risk of injury or fire is reduced or eliminated.

According to a third aspect of the present invention, a means of locomotion is being put forward which can especially encompass a traction onboard system that can have a voltage value above 50 V, particularly above 300 V. For this purpose, the means of locomotion, which can be configured, for instance, as a passenger car, a van, a truck, a motorcycle or the like, can have an electric and/or electrochemical source of traction power which, in case of a crash, has to be disconnected from the traction onboard system. Towards this end, as an essential feature of the means of locomotion, a device is being proposed according to the first-mentioned aspect of the invention and, as an alternative or in addition, an arrangement according to the second-mentioned aspect of the invention. By the same token, the features, feature combinations and advantages of the means of locomotion according to the invention correspond to those of the above-mentioned aspect of the invention so obviously that, for the sake of avoiding repetitions, reference is hereby made to the elaborations above.

According to a core notion of the present invention, an ignition lead with polarity reversal protection is being put forward that calls for rectification (for instance, by means of a bridge circuit) in the ignition lead. In this manner, an inherent safeguard is created against the ignition lead being connected with the incorrect polarity. The bridge circuit can be configured by using field-effect transistors without diodes in order to minimize threshold voltages. Moreover, as an alternative or in addition, it is being proposed that an ignition lead with threshold-value evaluation and temperature compensation be provided, by means of which the evaluation of the magnitude of the received signal level as well as its temperature compensation on the galvanically insulated ignition lead are carried out. In this manner, the electric insulation vis-à-vis the traction onboard system or the connectors of the traction battery can be realized.

BRIEF DESCRIPTION OF THE DRAWINGS

An embodiment of the invention will be described in detail below making reference to the accompanying drawing. The following is shown in the drawing.

DETAILED DESCRIPTION OF THE INVENTION

Figure 1:
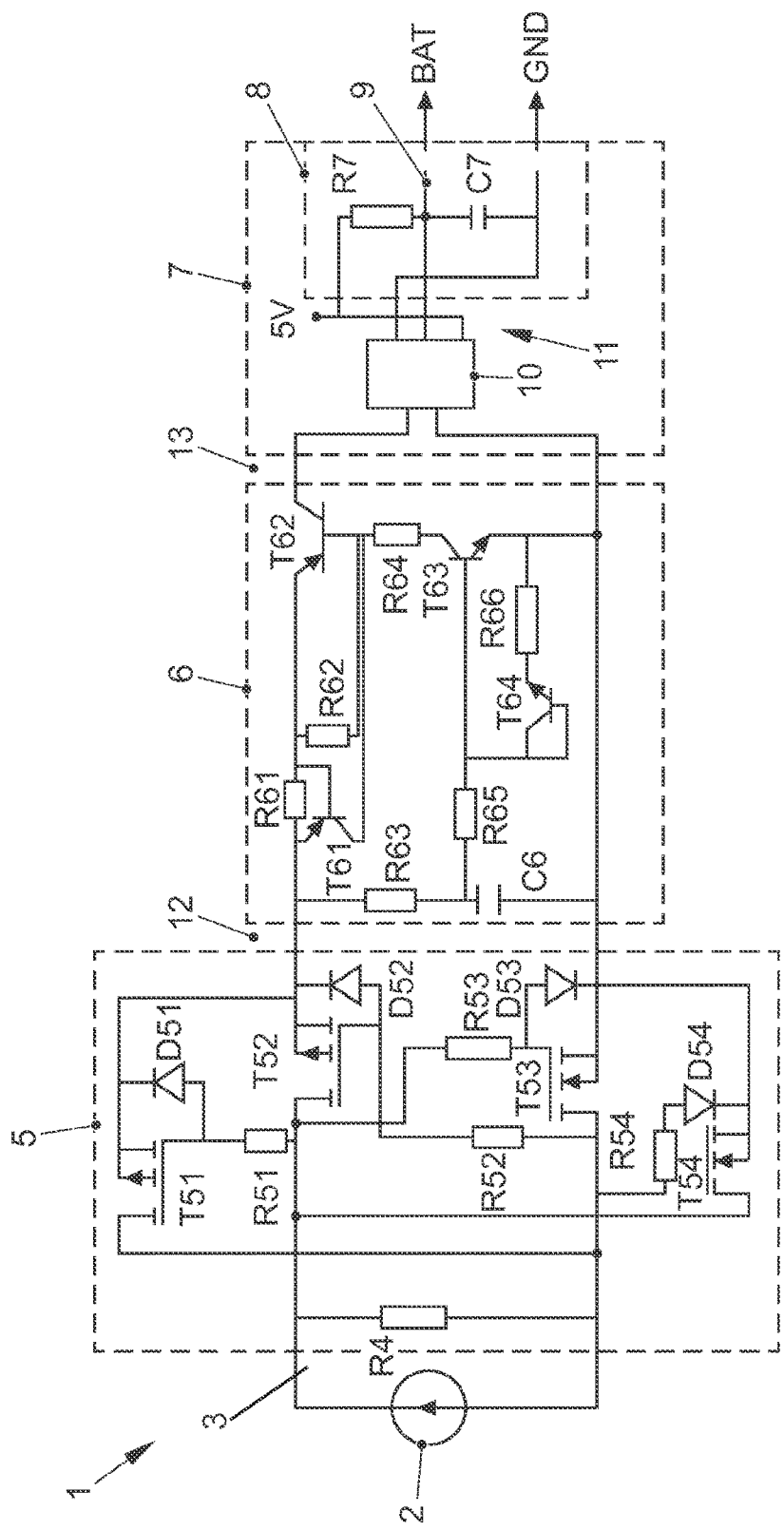
FIG. 1: a circuit diagram of an embodiment of a device according to the invention in the circuit of an embodiment of an inventive arrangement according to the invention for evaluating a signal of an airbag control unit.

FIG. 1 shows a circuit diagram depicting modules and components of an embodiment of the present invention. The circuit shown should be specifically understood as a "schematic circuit" for purposes of realizing the present invention, so that the scope of protection of the accompanying claims is not restricted to the arrangement shown or to parts thereof. The device 1 has a first connection 3 by means of which the device 1 can be connected to an airbag control unit 2 in the form of a source of current. In a manner of speaking, the first connection 3 forms the input of the device according to the invention 1 to which a resistor R4 is connected in parallel. For purposes of the inventive rectification of the input signal, a rectifier 5 based on field-effect transistors T51, T52, T53 and T54 adjoins the connection 3. The low flow thresholds of conductive field-effect transistors constitute a functionally reliable subsequent evaluation of the currents stemming from the airbag control unit 2. The output of the rectifier 5 is connected to a second connection 12 of a temperature-compensated driver 6. The temperature-compensated driver 6 receives the rectified signals from the airbag control unit 2, as a result of which the polarity of the airbag control unit 2 vis-à-vis the connection 3 of the rectifier 5 is immaterial. The temperature-compensated driver 6 carries out the temperature compensation, a current-limiting function provided by the resistor R61 and the transistor T61, and also the threshold-value monitoring. As long as the threshold value for the determination of a case of crash or of a crash signal turns out to be positive, an appropriate electric signal is applied via the connection 13 to the input of the optocoupler 10 that is provided in the member 7 for galvanic decoupling, whereupon a voltage level conducted to the battery or the battery control unit is established at the output of the optocoupler 10. The battery control unit can have a microcontroller which, in turn, is configured to open the contactor of the traction onboard system in case of a crash, thus preventing damage resulting from the crash event. For this purpose, the output 11 of the optocoupler 10 is linked to an output unit 8 which, if the device according to the invention is connected properly, is connected on the output side to the appertaining onboard system peripherals.

Figure 2:
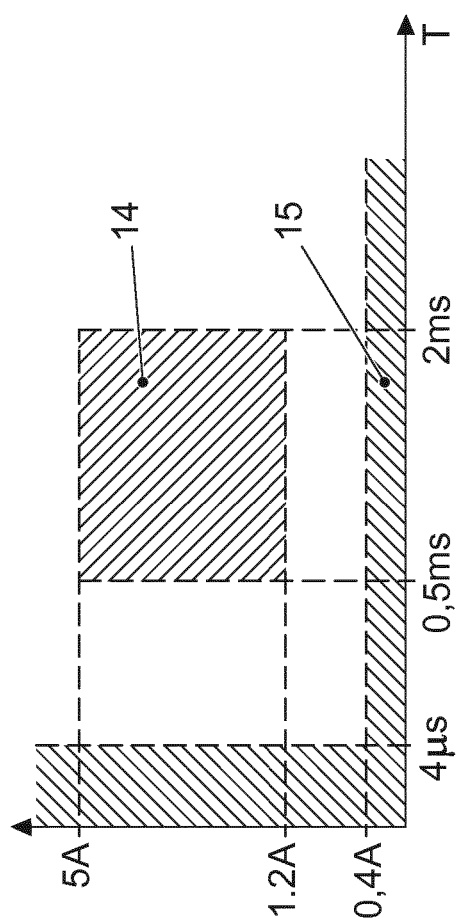
FIG. 2: a current-over-time diagram depicting crash-case signal areas and signal areas without detection of a crash case.

FIG. 2 shows a current-over-time diagram in which an area 14 between 1.2 A and 5 A or between 0.5 ms and 2 ms is highlighted by crosshatching. This area designates signal areas that are recognized as being a case of a crash. A crosshatched area 15 designates signal areas that can be classified with certainty as "not being a case of a crash". An appertaining differentiation is carried out according to the invention in the temperature-compensated driver of the present invention.

LIST OF REFERENCE NUMERALS 1 device
2 airbag control unit
3 first connection
5 rectifier
6 temperature-compensated driver
7 member for galvanic decoupling
8 output unit
9 crash-out line
10 optocoupler
11 output
12,13 connection
14 crash signal area
15 "not a crash signal area"
BAT line to the battery-management control unit
C capacitor
GND electric ground
D diode
R electric resistor
t time
T transistor

The invention claimed is:

1. A device for evaluating a signal of an airbag control unit, comprising:
    a first connection for electrically contacting an output of the airbag control unit,
    a rectifier that is electrically connected to the first connection,
    a temperature-compensated driver that is connected to an output of the rectifier, and
    a member for a galvanic decoupling of an output of the driver, having an output unit.

2. The device according to claim 1, whereby the output unit has a crash-out line.

3. The device according to claim 1, whereby the driver also has a current-limiting function.

4. The device according to claim 1, whereby the rectifier comprises a bridge rectifier.

5. The device according to claim 1, whereby the rectifier comprises FET rectifier.

6. The device according to claim 1, whereby the member for galvanic decoupling has an optocoupler.

7. An arrangement comprising:
    an airbag control unit,
    a ignition pellet reproduction and a device according to claim 1,
    whereby the first connection is connected to an airbag control unit.

8. The device according to claim 7, whereby the airbag control unit is configured to cyclically apply test pulses to the ignition pellet reproduction.

9. An electrically powered means of locomotion having an electric and/or electrochemical source of traction power, comprising:
    a device according to claim 1, and/or
    an arrangement comprising:
        an airbag control unit,
        a ignition pellet reproduction,
        whereby the first connection is connected to an airbag control unit.

* * * * *